US012770980B2

(12) United States Patent
Xu et al.

(10) Patent No.: US 12,770,980 B2
(45) Date of Patent: Oct. 20, 2026

(54) ELECTRICAL CONNECTING PLATE, BATTERY MODULE, BATTERY PACK, AND DEVICE

(71) Applicant: CONTEMPORARY AMPEREX TECHNOLOGY (HONG KONG) LIMITED, Hong Kong (CN)

(72) Inventors: Xiao Xu, Ningde City (CN); Yangzhi Huang, Ningde City (CN); Sheng Shen, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 734 days.

(21) Appl. No.: 17/555,931

(22) Filed: Dec. 20, 2021

(65) Prior Publication Data

US 2022/0115745 A1 Apr. 14, 2022

Related U.S. Application Data

(63) Continuation of application No. PCT/CN2020/123464, filed on Oct. 24, 2020.

(30) Foreign Application Priority Data

Nov. 4, 2019 (CN) ......................... 201921885117.7

(51) Int. Cl.
*H01M 50/503* (2021.01)

(52) U.S. Cl.
CPC ...... *H01M 50/503* (2021.01); *H01M 2220/20* (2013.01)

(58) Field of Classification Search
None
See application file for complete search history.

(56) References Cited

U.S. PATENT DOCUMENTS

2013/0029204 A1 1/2013 Khakhalev et al.
2013/0089755 A1 4/2013 Park et al.
(Continued)

FOREIGN PATENT DOCUMENTS

CN 204857840 U 12/2015
CN 106784570 A 5/2017
(Continued)

OTHER PUBLICATIONS

Machine translation of Li (CN 109103408 A). (Year: 2018).*
(Continued)

*Primary Examiner* — Tiffany Legette
*Assistant Examiner* — Christine Disney
(74) *Attorney, Agent, or Firm* — Scully, Scott, Murphy & Presser, P.C.

(57) ABSTRACT

An electrical connecting plate, a battery module, a battery pack, and a device are discoursed, which relate to the technical field of energy storage devices. The electrical connecting plate includes a first part and a second part. The first part includes a current-increasing portion and a body portion containing an avoidance region. The current-increasing portion is located in a specified region around the avoidance region. The current-increasing portion is connected to a side of the body portion in a thickness direction of the electrical connecting plate. The second part is connected to ends of the body portion and is configured to connect to a battery cell. The battery module includes a plurality of battery cells and the electrical connecting plate. The second part of the electrical connecting plate electrically connects electrode leads of a plurality of battery cells.

5 Claims, 6 Drawing Sheets

(56) References Cited

U.S. PATENT DOCUMENTS

| | | | | |
|---|---|---|---|---|
| 2016/0351883 | A1* | 12/2016 | Lemke ................ | H01M 10/482 |
| 2019/0259996 | A1* | 8/2019 | Fritz ................... | H01M 50/502 |

FOREIGN PATENT DOCUMENTS

| | | | | | |
|---|---|---|---|---|---|
| CN | 109103408 | A | 12/2018 | | |
| CN | 208589484 | U | 3/2019 | | |
| CN | 210467950 | U | 5/2020 | | |
| DE | 102011081106 | A1 | 2/2013 | | |
| JP | 2008311074 | A | 12/2008 | | |
| WO | WO-2018004158 | A1 * | 1/2018 | ............ | H01M 50/20 |
| WO | WO-2018083303 | A1 * | 5/2018 | ............ | H01M 50/20 |

OTHER PUBLICATIONS

Machine translation of Guen (WO-2018004158-A1). (Year: 2018).*

International Search Report dated Jan. 26, 2021 issued in PCT/CN2020/123464.

Extended European Search Report dated May 10, 2022 received in European Patent Application No. EP 20885093.3.

* cited by examiner

ELECTRICAL CONNECTING PLATE, BATTERY MODULE, BATTERY PACK, AND DEVICE

CROSS-REFERENCE TO RELATED APPLICATIONS

This application is a continuation of International Application No. PCT/CN2020/123464, filed on Oct. 24, 2020, which claims priority to Chinese Patent Application No. 201921885117.7, filed on Nov. 4, 2019. The disclosures of the aforementioned applications are hereby incorporated by reference in their entireties.

TECHNICAL FIELD

This application relates to the technical field of energy storage devices, and in particular, to an electrical connecting plate, a battery module, a battery pack, and a device.

BACKGROUND

With popularization of new energy electric vehicles, requirements imposed by vehicle manufacturers on a power battery pack are diversified. Especially, requirements on energy density, safety, and compatibility of a battery module are increasingly higher. Battery cells in the battery module are connected to each other by an electrical connecting plate, and output voltage outward after being connected in series and in parallel. Currently, fast charge technology of batteries has gradually become prevailing, a temperature of the electrical connecting plate is usually very high during fast charge. A too high temperature affects safety performance of the battery cells and the battery module.

Due to design requirements of the battery module, an avoidance region needs to be disposed on a body portion of the electrical connecting plate, thereby reducing a passage area on the body portion and reducing a current-carrying capacity. Consequently, a temperature rise is too high, and safety problems are likely to occur.

SUMMARY

This application provides an electrical connecting plate, a battery module, a battery pack, and a device to increase a passage area and improve a current-carrying capacity of the electrical connecting plate.

A first aspect of this application provides an electrical connecting plate applied to a battery module. The battery module includes a battery cell. The electrical connecting plate includes a first part and a second part.

The first part includes a current-increasing portion and a body portion containing an avoidance region.

The current-increasing portion is located in a specified region around the avoidance region. The current-increasing portion is connected to a side of the body portion in a thickness direction of the electrical connecting plate.

The second part is connected to ends of the body portion and is configured to connect to the battery cell.

In some embodiments, the body portion includes a first body portion and a connecting section. The avoidance region is a via hole or notch opened in the connecting section.

The current-increasing portion is located on the first body portion, and a width of the current-increasing portion is less than a width of the first body portion.

In some embodiments, the body portion further includes a second body portion. The first body portion is connected to the second body portion through the connecting section.

The current-increasing portion is located on the first body portion and/or the second body portion.

In some embodiments, the avoidance region is a via hole opened in the connecting section, and the current-increasing portion is located in the connecting section.

In some embodiments, the current-increasing portion includes a first current-increasing portion and a second current-increasing portion.

The first current-increasing portion, the via hole, and the second current-increasing portion are spaced out in a width direction of the connecting section.

In some embodiments, a groove is further disposed in the body portion, and the groove is located on one or two sides of the current-increasing portion.

In some embodiments, the current-increasing portion and the body portion are integrally formed.

The current-increasing portion is bent along a side wall of the body portion, and the body portion fits snugly with the current-increasing portion.

A second aspect of this application further provides a battery module, including a plurality of battery cells and the electrical connecting plate described above. A second part of the electrical connecting plate electrically connects electrode leads of the battery cells.

A third aspect of this application further provides a battery pack, including the battery module described above.

A fourth aspect of this application further provides a device using a battery cell as a power supply. The device includes: a power source configured to provide a driving force for the device; and a battery module described above and configured to provide electrical energy to the power source.

The technical solutions provided in this application achieve the following beneficial effects:

The first part of the electrical connecting plate according to this application includes a body portion and a current-increasing portion, and the body portion contains an avoidance region. The current-increasing portion is located in a specified region around the avoidance region, and the current-increasing portion is connected to a side of the body portion. At the body portion containing the avoidance region, the area decreases, and therefore, the passage area also decreases. Therefore, the current-increasing portion is disposed in a specified region around the avoidance region to increase the passage area and effectively improve the current-carrying capacity of the electrical connecting plate.

Understandably, the above general description and the following detailed description are merely exemplary without limiting this application.

BRIEF DESCRIPTION OF DRAWINGS

To describe the technical solutions in the embodiments of this application more clearly, the following outlines the drawings used in the embodiments of this application. Apparently, the drawings outlined below are merely a part of embodiments of this application. A person of ordinary skill in the art may derive other drawings from the outlined drawings without making any creative efforts.

REFERENCE NUMERALS

Figure 1:
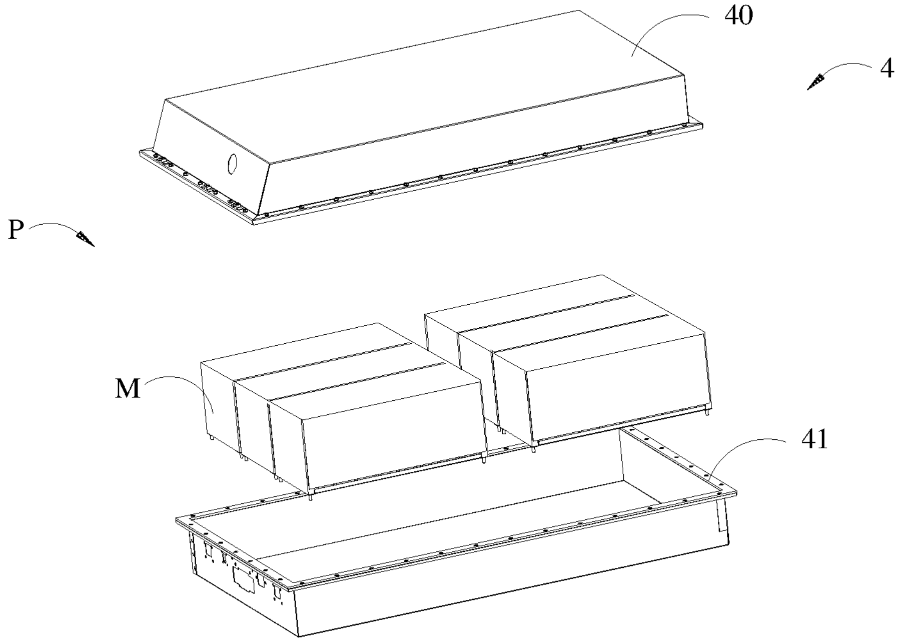
FIG. 1 is a schematic structural diagram of a battery pack according to an embodiment of this application.

P—battery pack; M—battery module; 1—electrical connecting plate; 10—first part; 101—body portion; 101*a*—avoidance region; 101*b*—first body portion; 101*c*—second body portion; 101*d*—connecting section; 101*da*—first connecting section; 101*db*—second connecting section; 101*e*—groove; 102—current-increasing portion; 102*a*—first current-increasing portion; 102*b*—second current-increasing portion; 102*c*—third current-increasing portion; 11—second part; 2—frame structure; 20—side plate; 21—end plate; 3—battery cell; 30—top cover assembly; 301—top cover plate; 302—electrode lead; 303—explosion-proof aperture; 31—housing; 32—electrode assembly; 4—box body; 40—upper box; and 41—lower box.

DETAILED DESCRIPTION OF EMBODIMENTS

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means two or more; the terms such as "upper", "lower", "left", "right", "inner", and "outer" indicating a direction or a position relationship are merely intended for ease or brevity of description of this application, but do not indicate or imply that the device or component referred to must be located in the specified direction or constructed or operated in the specified direction. Therefore, such terms shall not be understood as a limitation on this application. In addition, the terms "first", "second", and "third" are merely intended for descriptive purposes, but are not intended to indicate or imply relative importance. "Perpendicular" is not exactly perpendicular, but within an error tolerance range. "Parallel" is not exactly parallel, but within an error tolerance range.

The directional terms appearing in the following description indicate the directions shown in the drawings, but are not intended to limit specific structures in this application. In the context of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

An embodiment of this application provides a device using a battery cell as a power supply. The device includes: a power source, where the power source is configured to provide a driving force for the device; and a battery module M configured to provide electrical energy to the power source. The device using a battery cell 3 as a power supply may be a mobile device such as a vehicle, a ship, or a small aircraft. The device includes a power source, and the power source is configured to provide a driving force for the device. The power supply may be configured as a battery module M that provides electrical energy to the power source. The driving force of the device may be sole electrical energy, or may include electrical energy and other types of energy (such as mechanical energy). The power source may be a battery module M (or a battery pack P), or may be a combination of a battery module M (or battery pack P) and an engine, or the like. Therefore, all devices that can use a battery cell 3 as a power supply fall within the protection scope of this application.

Using a vehicle as an example, a vehicle according to an embodiment of this application may be a new energy vehicle. The new energy vehicle may be a battery electric vehicle, or may be a hybrid electric vehicle, a range-extended electric vehicle, or the like. The vehicle may include a battery pack and a vehicle body. The battery pack is disposed in the vehicle body. A driving motor is further disposed in the vehicle body, and the driving motor is electrically connected to the battery pack. The battery pack provides electrical energy. The driving motor is connected to wheels of the vehicle body through a transmission mechanism to drive the vehicle to run. Specifically, the battery pack may be horizontally disposed at a bottom of the vehicle body.

As shown in FIG. 1, a battery pack P according to this embodiment of this application includes a box body 4 and a battery module M disposed in the box body 4. The box body 4 may be made of aluminum, an aluminum alloy or another metal material. The box body 4 includes an upper box 40 and a lower box 41. The upper box 40 is snap-fitted with the lower box 41 to form an accommodation cavity. The accommodation cavity can accommodate one or at least two battery modules M. The battery modules M may be disposed alongside in a length direction of the battery pack P in the box body 4, or may be disposed alongside in a width direction of the battery pack P. Each battery module M is fixed to the box body 4.

Figure 2:
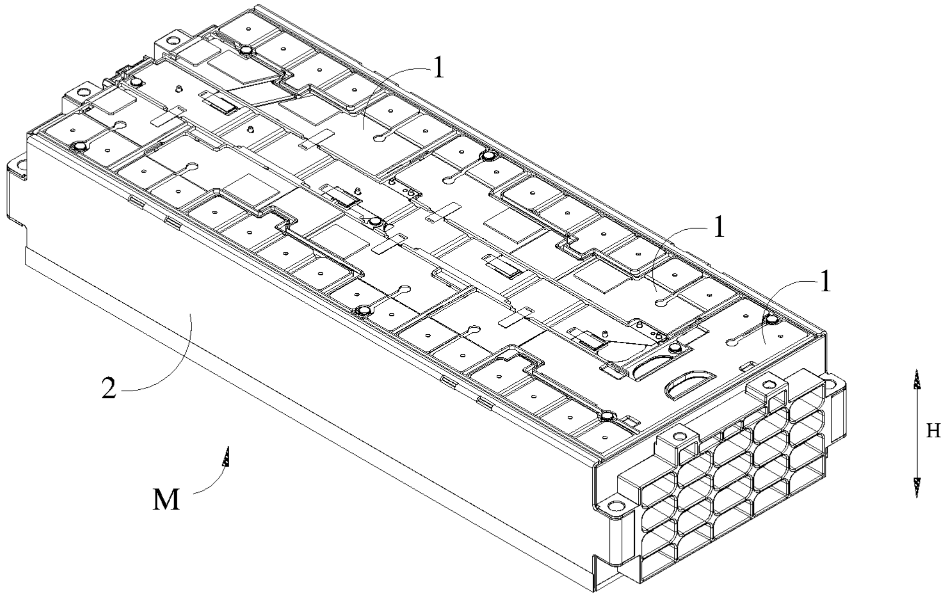
FIG. 2 is a schematic structural diagram of a battery module according to an embodiment of this application.
Figure 3:
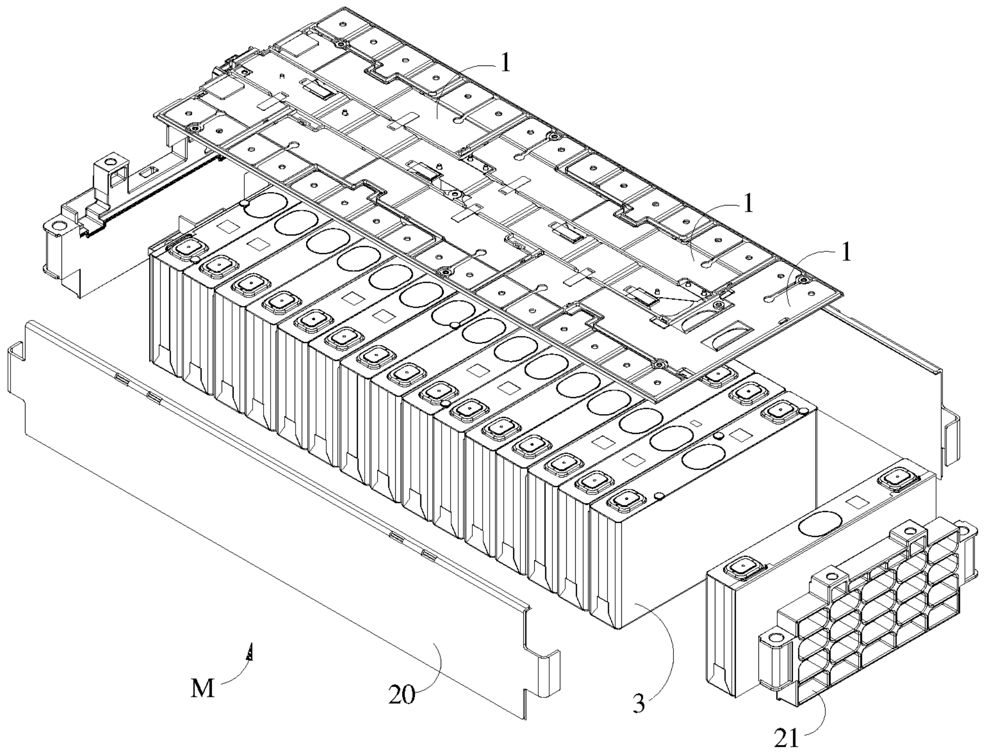
FIG. 3 is an exploded view of a battery module according to an embodiment of this application.

As shown in FIG. 2 and FIG. 3, an embodiment of this application provides a battery module M, including a plurality of battery cells 3 and a frame structure 2. The battery cells 3 may be secondary batteries that can be repeatedly charged and discharged. A plurality of battery cells 3 are located in the inner cavity of the frame structure 2 and stacked on each other in the inner cavity. The frame structure 2 includes side plates 20 and end plates 21. The side plates 20 and the end plates 21 jointly fix the battery cells 3. The battery cells 3 are connected to each other in series or in parallel by an electrical connecting plate 1.

Figure 4:
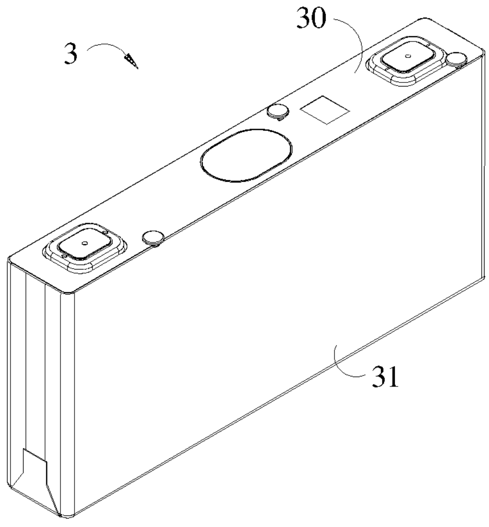
FIG. 4 is a schematic structural diagram of a battery cell according to an embodiment of this application.
Figure 5:
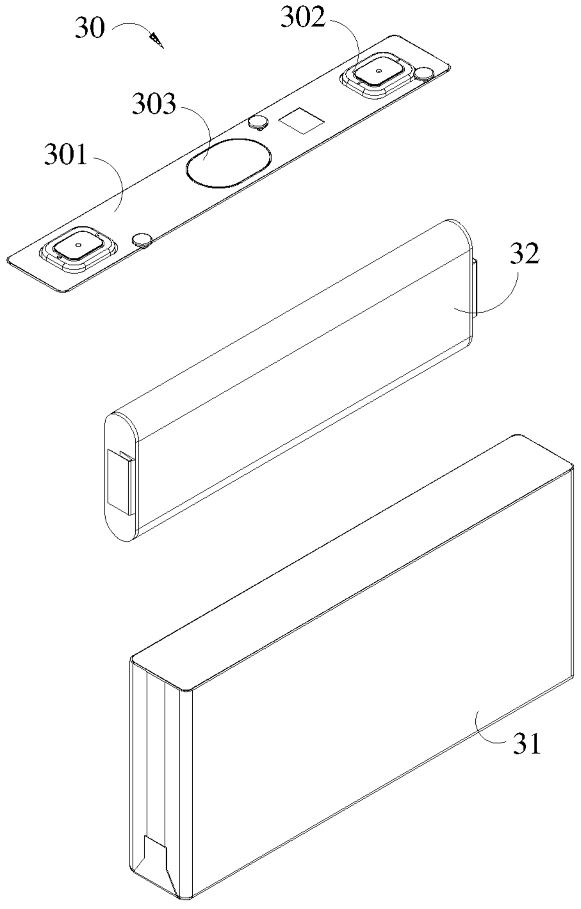
FIG. 5 is an exploded view of a battery cell according to an embodiment of this application.

As shown in FIG. 4 and FIG. 5, a battery cell 3 includes at least an electrode assembly 32, a housing 31, and electrode leads 302. The housing 31 may be a hexahedron or another shape. An accommodation cavity is formed in the housing 31, and is configured to accommodate the electrode assembly 32 and an electrolytic solution. The electrode leads 302 are electrically connected to the electrode assembly 32. The housing 31 may include a metal material, such as aluminum or an aluminum alloy, or may include an insulation material such as plastic.

As shown in FIG. 5, a top cover assembly 30 includes a top cover plate 301 and electrode leads 302. The top cover plate 301 is fixed to an opening of the housing 31, so that the electrode assembly 32 and the electrolytic solution are enclosed in the accommodation cavity of the housing 31. The electrode leads 302 are disposed on the top cover plate 301. The top cover plate 301 contains an explosion-proof aperture 303.

The battery module M further includes an electrical connecting plate 1. The electrical connecting plate 1 electrically connects the electrode leads 302 of a plurality of battery cells 3 so that the plurality of battery cells 3 are connected to each other in series or in parallel.

As shown in FIG. 6 to FIG. 9, an embodiment of this application provides an electrical connecting plate 1 for a battery module M, including a first part 10 and a second part 11. The first part 10 includes a body portion 101 and a current-increasing portion 102. The body portion 101 contains an avoidance region 101*a*. The current-increasing portion 102 is located in a specified region around the avoidance region 101*a*. The second part 11 is connected to ends of the body portion 101 and is configured to connect to the battery cells 3.

When the electrical connecting plate 1 connects to the battery cells 3, in order to avoid parts of the battery cells 3 such as an explosion-proof valve disposed at the explosion-proof aperture 303, an avoidance region 101*a* needs to be disposed on the electrical connecting plate 1. After the avoidance region 101*a* is disposed, a current-carrying capacity of the electrical connecting plate 1 is reduced, thereby resulting in a too high temperature rise and vulnerability to safety problems.

In the electrical connecting plate 1 according to an embodiment of this application, at the body portion 101 containing the avoidance region 101*a*, the area decreases, and therefore, the passage area also decreases. Therefore, the current-increasing portion 102 is disposed in a specified region around the avoidance region 101*a* to increase the passage area and effectively improve the current-carrying capacity of the electrical connecting plate 1.

Understandably, the current-increasing portion 102 may be located in a specified region around the avoidance region 101*a* according to actual conditions, for example, located in a region using a center of the avoidance region 101*a* as a center and using a specified value as a radius, or a region using a reference edge of the avoidance region 101*a* as a reference and extending for a specified distance, or the like. This is not limited herein.

Figure 8:
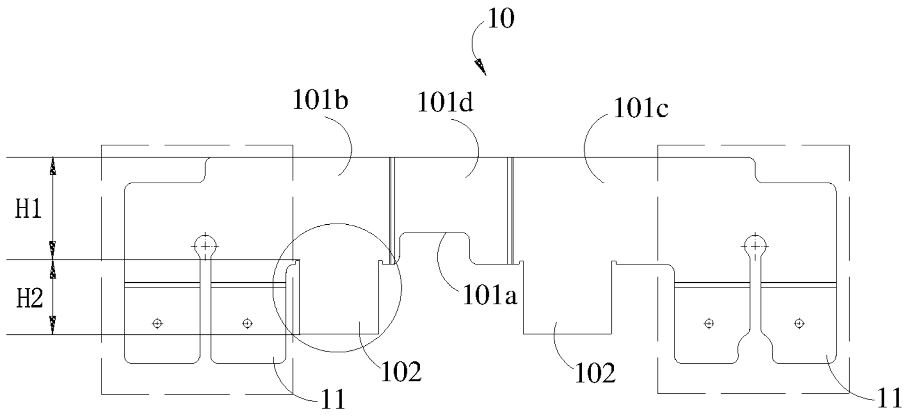
FIG. 8 is a front view of a first type of electrical connecting plate before a current-increasing portion is bent according to an embodiment of this application.

In this embodiment, as shown in FIG. 8, the first part 10 and the second part 11 are an integrated structure, so as to facilitate processing and manufacturing of the electrical connecting plate 1. Specifically, the electrical connecting plate 1 may be a plate-like or sheet-like structure made of a metal material. More specifically, in this embodiment, the current-increasing portion 102 of the first part 10 and the body portion 101 are integrally formed. That is, the current-increasing portion 102 and the body portion 101 each are an integral part of the electrical connecting plate 1.

Specifically, the electrical connecting plate 1 may be manufactured by trimming. First, according to design requirements, the electrical connecting plate 1 shown in FIG. 8 is obtained by trimming a metal plate or a metal sheet. In this case, two ends of the first part 10 of the electrical connecting plate 1 are connected to two second parts 11 respectively, and the current-increasing portion 102 is connected to a side wall of the body portion 101. Subsequently, the current-increasing portion 102 is bent along a side wall of the body portion 101 so that the current-increasing portion 102 fits snugly with the body portion 101. To be specific, the current-increasing portion 102 obtained by cutting is bent and then flattened, so that the current-increasing portion 102 fits closely with the body portion 101 to obtain the electrical connecting plate 1 shown in FIG. 7. In this case, the current-increasing portion 102 is connected to a side of the body portion 101 in a thickness direction H of the electrical connecting plate 1. By bending the current-increasing portion 102, a space in a width direction and a height direction of the battery module M can be saved. Compared with a practice of bending the current-increasing portion 102 to form an angle to the body portion 101, the practice of fitting snugly with the body portion 101 optimizes a forming process, and can control the shape and position of the bent electrical connecting plate 1 more accurately. This practice can also shorten a passage path and increase a passage cross-sectional area at a snugly fitting position, thereby reducing a resistance of the electrical connecting plate 1 and reducing a temperature rise.

Further, it needs to be noted that the shape of the current-increasing portion 102 may be a rectangular, trapezoidal or irregular shape, as long as the current-increasing portion 102 does not exceed edges of the body portion 101 and the second part 11. This facilitates the manufacturing of the electrical connecting plate 1, and avoids material waste caused by too much scrap generated during the cutting.

Alternatively, the electrical connecting plate 1 may be manufactured integrally by a casting or machining process. A side of the body portion 101 is locally thickened in the thickness direction H of the electrical connecting plate 1 to form the current-increasing portion 102.

In this embodiment of this application, the body portion 101 includes a first body portion 101*b* and a connecting section 101*d*. The avoidance region 101*a* is a via hole or notch opened in the connecting section 101*d*. In this case, one end of the first body portion 101*b* is connected to one second part 11, the other end is connected to one end of the connecting section 101*d*, and the other end of the connecting section 101*d* is connected to the other second part 11. In this embodiment, the avoidance region 101*a* is disposed in the connecting section 101*d*. The avoidance region 101*a* may be in the form of a via hole or a notch to avoid the structure of the battery cells 3. The current-increasing portion 102*b* may be disposed on the first body portion 101*b*.

When the avoidance region 101*a* is a notch, the connecting section 101*d* may be locally narrowed. Electrode leads 302 of some battery cells 3 contain a protruding part, and the notch fits the protruding part, thereby facilitating connection between the body portion 101 and the battery cells 3. However, after the notch is disposed in the connecting section 101*d*, the area at the position of the notch decreases, and the passage area at the position also decreases. Therefore, a current-increasing portion 102 is disposed in a specified region around the notch to increase the passage area and effectively improve the current-carrying capacity of the electrical connecting plate 1.

When the avoidance region 101*a* is a via hole, the via hole may be disposed to avoid an explosion-proof valve of a battery cell 3. Therefore, a hole is opened on the electrical connecting plate 1. However, after the hole is opened, the area at this position of the connecting section 101*d* is reduced, and the passage area at this position also decreases. Therefore, a current-increasing portion 102 is disposed in a specified region around the avoidance region 101*a* to increase the passage area and effectively improve the current-carrying capacity of the electrical connecting plate 1.

Figure 6:
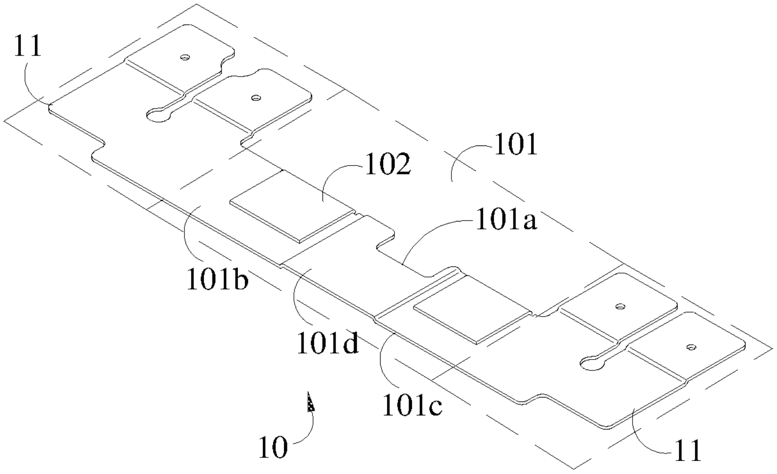
FIG. 6 is a schematic structural diagram of a first type of electrical connecting plate according to an embodiment of this application.
Figure 7:
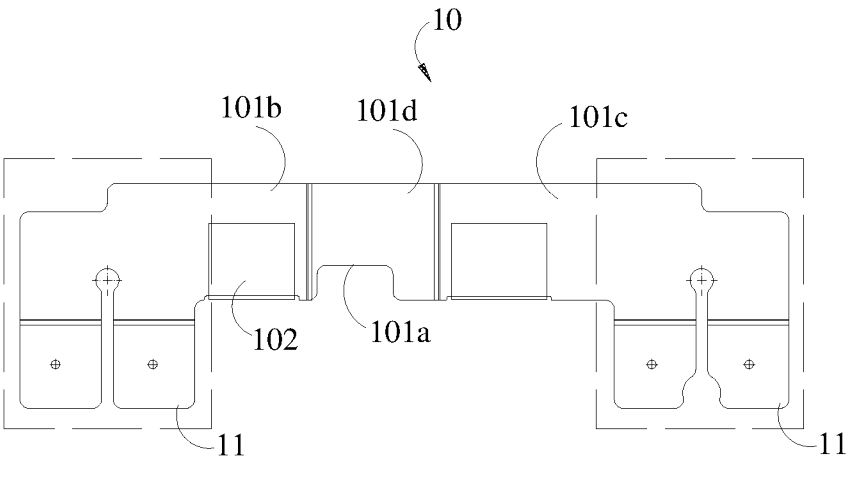
FIG. 7 is a front view of a first type of electrical connecting plate after a current-increasing portion is bent according to an embodiment of this application.

As shown in FIG. 6 to FIG. 8, in this embodiment of this application, the current-increasing portion 102 is located on the first body portion 101*b*, and a width H2 of the current-increasing portion 102 is less than a width H1 of the first body portion 101*b*. The battery module M usually further includes a wiring harness separator. To avoid being restricted by the wiring harness separator, the width of the current-increasing portion 102 disposed is less than the width of the first body portion 101*b*, thereby facilitating overall assembly of the battery module M. Understandably, the closer the width of the current-increasing portion 102 is to the width of the first body portion 101*b*, the larger the passage area of the electrical connecting plate 1.

Figure 11:
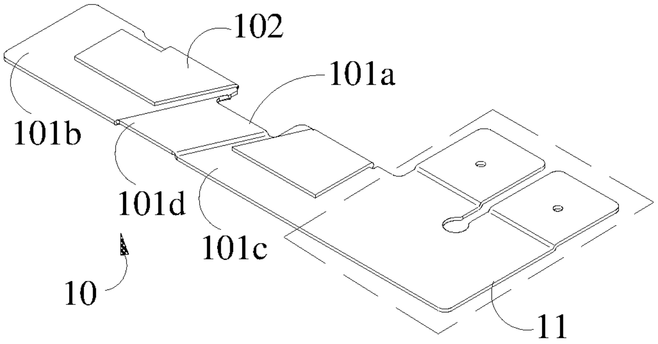
FIG. 11 is a schematic structural diagram of a third type of electrical connecting plate according to an embodiment of this application.

In a specific implementation, the body portion 101 further includes a second body portion 101*c*. The first body portion 101*b* is connected to the second body portion 101*c* by the connecting section 101*d*. The current-increasing portion 102 is located on the first body portion 101*b* and/or the second body portion 101*c*. As shown in FIG. 6, there are two current-increasing portions 102 located on the first body portion 101*b* and the second body portion 101*c* respectively. The electrical connecting plate 1 is generally located in the middle of the battery module M, and is configured to electrically connect the electrode leads 302 of the battery cells 3. Alternatively, as shown in FIG. 11, the current-increasing portion 102 is located on the first body portion 101*b* and the second body portion 101*c* separately. The electrical connecting plate 1 shown in FIG. 11 is generally located at an edge of the battery module M, and is configured to electrically connect the electrode leads 302 of the battery cells 3 located in an edge position.

It needs to be noted that the current-increasing portion 102 is disposed on both sides of the connecting section 101*d* containing a notch. Compared with a circumstance in which the current-increasing portion 102 is disposed on a single side of the connecting section 101*d* containing a notch, the current-carrying capacity of the electrical connecting plate 1 with current-increasing portions 102 disposed on both sides is much higher.

Figure 10:
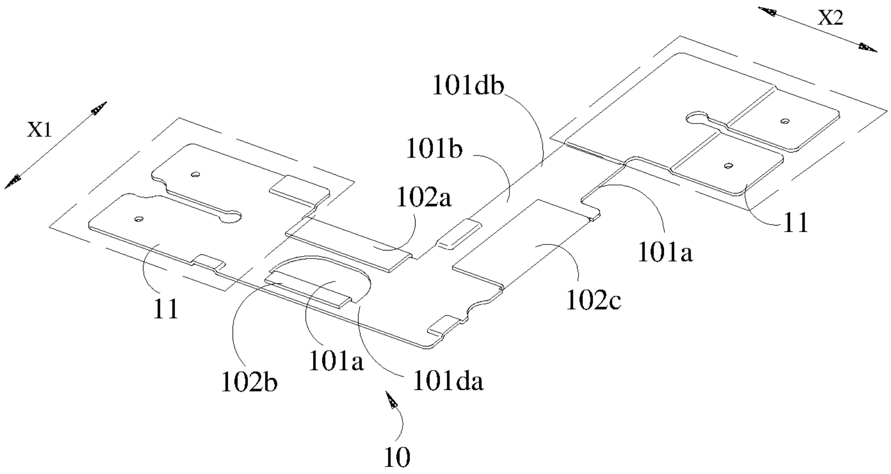
FIG. 10 is a schematic structural diagram of a second type of electrical connecting plate according to an embodiment of this application.

As shown in FIG. 10, a first connecting section 101*da* and a second connecting section 101*db* are connected to two ends of the first body portion 101*b* respectively. To be specific, the connecting section 101*d* includes the first connecting section 101*da* and the second connecting section 101*db*, and the first connecting section 101*d* is at a specified angle to the first body portion 101*b*, where the specified angle is 90°. The electrical connecting plate 1 is generally located at the edge of the battery module M, and is configured to electrically connect the electrode leads 302 of a plurality of battery cells 3. In another specific embodiment, the avoidance region 101*a* is a via hole opened in the connecting section 101*d*, and the current-increasing portion 102 is located in the connecting section 101*d*. In a specific implementation, the avoidance region 101*a* is a via hole opened in the first connecting section 101*da*, and the current-increasing portion 102 is located in the first connecting section 101*da*. At a position of the first connecting section 101*da* where the via hole is opened, the area decreases, and the passage area at the position also decreases. Therefore, the current-increasing portion 102 is disposed in a specified region around the avoidance region 101*a* to increase the passage area and effectively improve the current-carrying capacity of the electrical connecting plate 1.

It needs to be noted that the current-increasing portion 102 includes a first current-increasing portion 102*a* and a second current-increasing portion 102*b*. The first current-increasing portion 102*a* and the second current-increasing portion 102*b* are both located in the first connecting section 101*da*. The first current-increasing portion 102*a*, the via hole, and the second current-increasing portion 102*b* are spaced out in a width direction X1 of the first connecting section 101*da*. The spaced-out arrangement facilitates balanced distribution of electrical current, avoids excessive deviation of the passage area, and also facilitates control of the size of the current-increasing portion 102 in the thickness direction H of the electrical connecting plate 1.

Specifically, in an embodiment, the first current-increasing portion 102*a* is connected to a side wall of the first connecting section 101*da*, and the second current-increasing portion 102*b* is connected to a hole wall of the via hole. The current-increasing portion 102 is bent so that both the first current-increasing portion 102*a* and the second current-increasing portion 102*b* fit snugly with the first connecting section 101*da*. The first current-increasing portion 102*a* is bent along the side wall of the first connecting section 101*da*, and extends toward a direction close to the via hole. In this way, the edge of the first current-increasing portion 102*a* is close to the hole wall of the via hole but without blocking the via hole. The closer the width of the first current-increasing portion 102*a* is to the hole wall of the via hole, the larger the passage area of the electrical connecting plate 1. The second current-increasing portion 102*b* is bent along the hole wall of the via hole and extends toward a direction away from the via hole. In this way, the second current-increasing portion 102*b* is close to the side wall of the first connecting section 101*da*, and the width of the second current-increasing portion 102*b* is closer to the edge of the first connecting section 101*da*, and the larger the passage area of the electrical connecting plate 1.

Further, the avoidance region 101*a* is a notch opened in the second connecting section 101*db*. To be specific, the second connecting section 101*db* is locally narrowed. Electrode leads 302 of some battery cells 3 contain a protruding part, and the notch fits the protruding part, thereby facilitating connection between the body portion 101 and the battery cells 3. However, after the notch is disposed in the second connecting section 101*db*, the area at the position of the notch decreases, and the passage area at the position also decreases. Therefore, a current-increasing portion 102 is disposed in a specified region around the notch to increase the passage area and effectively improve the current-carrying capacity of the electrical connecting plate 1.

It needs to be noted that the current-increasing portion 102 may further include a third current-increasing portion 102*c*. The third current-increasing portion 102*c* is located on the first body portion 101*b*. As restricted by the wiring harness separator, in the width direction X2 of the first body portion 101*b*, the width of the third current-increasing portion 102*c* is less than the width of the first body portion 101*b*, but the width of the third current-increasing portion 102*c* is close to the width of the first body portion 101*b*, thereby increasing the passage area of the electrical connecting plate 1. A notch is disposed in the second connecting section 101*db*. The notch and the third current-increasing portion 102*c* are arranged in a length direction X1 of the first body portion 101*b*. Because a notch is disposed on the first body portion 101*b*, the third current-increasing portion 102*c* disposed increases the current-carrying capacity of the electrical connecting plate 1.

As shown in FIG. 11, the second part 11 is connected to an end of the first part 10. The body portion 101 includes a first body portion 101*b* and a second body portion 101*c*. The first body portion 101*b* is connected to the second body portion 101*c* by the connecting section 101*d*. The current-increasing portion 102 is located on the first body portion 101*b* and the second body portion 101*c*. One end of the second body portion 101*c* is connected to the second part 11. One end of the first body portion 101*b* is connected to an output end of the battery module M.

In this embodiment of this application, in the thickness direction H of the electrical connecting plate 1, the current-increasing portion 102 is located on one side of the body portion 101, and the current-increasing portion 102 is located above the body portion 101. When the electrical connecting plate 1 is connected to the battery cells 3, in the thickness direction H, the current-increasing portion 102 is located above the electrical connecting plate 1, or, located below the electrical connecting plate 1. With the current-increasing portion 102 being disposed on one side of the body portion 101, the electrical connecting plate 1 is merely locally thickened in the height direction, without affecting the length direction and the width direction, thereby occupying a relatively small space.

Figure 9:
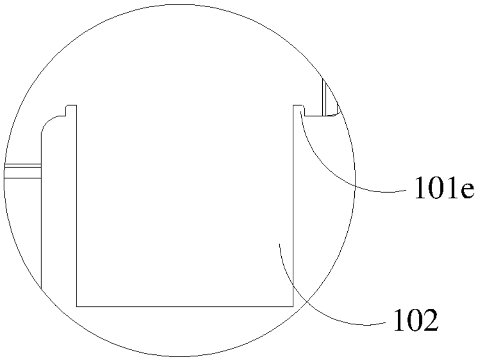
FIG. 9 is a local detailed view of a part of the first type of electrical connecting plate shown in FIG. 8 according to an embodiment of this application.

As shown in FIG. 9, in this embodiment of this application, a groove 101*e* is further disposed in the body portion 101, and the groove 101*e* is located on one or two sides of the current-increasing portion 102. When the current-increasing portion 102 of the electrical connecting plate 1 is bent, damage caused by stress concentration of the electrical connecting plate 1 arising from the bending can be avoided, thereby ensuring appropriate strength performance and functionality of the bent electrical connecting plate 1.

Specifically, grooves 101*e* may be disposed on both sides of the current-increasing portion 102, and the width of each groove 101*e* is greater than 1.2 mm, thereby further avoiding the problem of stress concentration of the electrical connecting plate 1 arising from the bending.

It needs to be noted that the width of the groove 101*e* is generally set to 1.5 mm.

As can be learned from the foregoing detailed description of this application, the electrical connecting plate 1 provided in this embodiment includes a first part 10 and a second part 11. The first part 10 includes a body portion 101 and a current-increasing portion 102. A connecting section 101*d* and an avoidance region 101*a* are disposed on the body portion 101. The avoidance region 101*a* is a via hole or notch opened in the connecting section 101*d*. The current-increasing portion 102 is located in a specified region around the via hole or notch. After the notch or via hole is disposed in the connecting section 101*d*, the area at the position of the notch or via hole decreases, and the passage area at the position also decreases. Therefore, the current-increasing portion 102 is disposed in the specified region around the notch or via hole to increase the passage area and effectively improve the current-carrying capacity of the electrical connecting plate 1.

Although this application has been described with reference to exemplary embodiments, various improvements may be made to the embodiments without departing from the scope of this application, and the parts therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. An electrical connecting plate applied to a battery module, wherein the battery module comprises a battery cell, and the electrical connecting plate comprises a first part and a second part;

the first part comprises a current-increasing portion and a body portion containing an avoidance region;

the current-increasing portion is located in a specified region around the avoidance region, and the current-increasing portion is connected to a side of the body portion in a thickness direction of the electrical connecting plate; and the second part is connected to ends of the body portion and is configured to connect to the battery cell;

wherein the body portion comprises a first body portion and a connecting section, and the avoidance region is a via hole or notch opened in the connecting section, the avoidance region is configured to avoid an explosion-proof valve disposed at an explosion-proof aperture of the battery cell, so that the electrical connecting plate does not block the explosion-proof valve;

the body portion further comprises a second body portion, and the first body portion is connected to the second body portion through the connecting section; and the current-increasing portion isn't located on the connecting section;

the current-increasing portion is located on the first body portion, the first body portion is further provided with a groove, and the groove is located at least at one of two ends, along a first direction, of a connection portion between the first body portion and the current-increasing portion, wherein the first direction is an extending direction of the connection portion between the first body portion and the current-increasing portion, the groove is disposed locally adjacent to the current-increasing portion, rather than extending across the first body portion; and/or, the current-increasing portion is located on the second body portion, the second body portion is further provided with a groove, and the groove is located at least at one of two ends, along a second direction, of a connection portion between the second body portion and the current-increasing portion, wherein the second direction is an extending direction of the connection portion between the second body portion and the current-increasing portion, the groove is disposed locally adjacent to the current-increasing portion, rather than extending across the second body portion.

2. The electrical connecting plate according to claim 1, wherein the current-increasing portion is located on the first body portion, and a width of the current-increasing portion is less than a width of the first body portion.

3. The electrical connecting plate according to claim 1, wherein the current-increasing portion and the body portion are integrally formed; and the current-increasing portion is bent along a side wall of the body portion, and the body portion fits snugly with the current-increasing portion.

4. A battery module, comprising a plurality of battery cells and an electrical connecting plate, wherein the electrical connecting plate comprises a first part and a second part, and the second part of the electrical connecting plate electrically connects electrode leads of the battery cells;

the first part comprises a current-increasing portion and a body portion containing an avoidance region;

the current-increasing portion is located in a specified region around the avoidance region, and the current-increasing portion is connected to a side of the body portion in a thickness direction of the electrical connecting plate; and the second part is connected to ends of the body portion and is configured to connect to the battery cell;

wherein the body portion comprises a first body portion and a connecting section, and the avoidance region is a via hole or notch opened in the connecting section, the avoidance region is configured to avoid an explosion-proof valve disposed at an explosion-proof aperture of the battery cell, so that the electrical connecting plate does not block the explosion-proof valve;

the body portion further comprises a second body portion, and the first body portion is connected to the second body portion through the connecting section; and the current-increasing portion isn't located on the connecting section;

the current-increasing portion is located on the first body portion, the first body portion is further provided with a groove, and the groove is located at least at one of two ends, along a first direction, of a connection portion between the first body portion and the current-increasing portion, wherein the first direction is an extending direction of the connection portion between the first body portion and the current-increasing portion, the groove is disposed locally adjacent to the current-increasing portion, rather than extending across the first body portion; and/or, the current-increasing portion is located on the second body portion, the second body portion is further provided with a groove, and the groove is located at least at one of two ends, along a second direction, of a connection portion between the second body portion and the current-increasing portion, wherein the second direction is an extending direction of the connection portion between the second body portion and the current-increasing portion, the groove is disposed locally adjacent to the current-increasing portion, rather than extending across the second body portion.

5. A device using a battery cell as a power supply, comprising: a power source, configured to provide a driving force for the device; and a battery module, configured to provide electrical energy to the power source, wherein the battery module comprises a plurality of battery cells and an electrical connecting plate;

the electrical connecting plate comprises a first part and a second part, and the second part of the electrical connecting plate electrically connects electrode leads of the battery cells;

the first part comprises a current-increasing portion and a body portion containing an avoidance region;

the current-increasing portion is located in a specified region around the avoidance region, and the current-increasing portion is connected to a side of the body portion in a thickness direction of the electrical connecting plate; and the second part is connected to ends of the body portion and is configured to connect to the battery cell;

wherein the body portion comprises a first body portion and a connecting section, and the avoidance region is a via hole or notch opened in the connecting section, the avoidance region is configured to avoid an explosion-proof valve disposed at an explosion-proof aperture of the battery cell, so that the electrical connecting plate does not block the explosion-proof valve;

the body portion further comprises a second body portion, and the first body portion is connected to the second body portion through the connecting section; and the current-increasing portion isn't located on the connecting section;

the current-increasing portion is located on the first body portion, the first body portion is further provided with a groove, and the groove is located at least at one of two ends, along a first direction, of a connection portion between the first body portion and the current-increasing portion, wherein the first direction is an extending direction of the connection portion between the first body portion and the current-increasing portion, the groove is disposed locally adjacent to the current-increasing portion, rather than extending across the first body portion; and/or, the current-increasing portion is located on the second body portion, the second body portion is further provided with a groove, and the groove is located at least at one of two ends, along a second direction, of a connection portion between the second body portion and the current-increasing portion, wherein the second direction is an extending direction of the connection portion between the second body portion and the current-increasing portion, the groove is disposed locally adjacent to the current-increasing portion, rather than extending across the second body portion.

* * * * *